(12) United States Patent
Colarelli, III et al.

(10) Patent No.: US 11,610,184 B2
(45) Date of Patent: Mar. 21, 2023

(54) METHOD FOR VEHICLE SPECIFICATION FILTERING IN RESPONSE TO VEHICLE INSPECTION RESULTS

(71) Applicant: Hunter Engineering Company, Bridgeton, MO (US)

(72) Inventors: Nicholas J. Colarelli, III, Frontenac, MO (US); Timothy A. Larson, Ferguson, MO (US); Daniel G. Eberhart, Bethalto, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 313 days.

(21) Appl. No.: 16/901,372

(22) Filed: Jun. 15, 2020

(65) Prior Publication Data

US 2020/0311694 A1     Oct. 1, 2020

Related U.S. Application Data

(62) Division of application No. 15/676,557, filed on Aug. 14, 2017, now Pat. No. 10,699,253.

(60) Provisional application No. 62/375,294, filed on Aug. 15, 2016.

(51) Int. Cl.
  *G06Q 10/00* (2012.01)
  *G06Q 10/20* (2023.01)
  *G06V 20/62* (2022.01)

(52) U.S. Cl.
  CPC ............. *G06Q 10/20* (2013.01); *G06V 20/62* (2022.01)

(58) Field of Classification Search
  CPC .............................. G06Q 10/20; G06V 20/62
  See application file for complete search history.

(56) References Cited

U.S. PATENT DOCUMENTS

| | | | |
|---|---|---|---|
| 5,774,361 A | 6/1998 | Colarelli, III et al. | |
| 2003/0217052 A1 | 11/2003 | Rubenczyk et al. | |
| 2010/0293181 A1* | 11/2010 | Muller | G06F 16/245 707/708 |
| 2013/0041950 A1* | 2/2013 | Chan | G06Q 30/0273 709/204 |
| 2015/0019533 A1 | 1/2015 | Moody et al. | |
| 2017/0031997 A1* | 2/2017 | Merg | G06Q 10/06 |
| 2020/0166337 A1 | 5/2020 | Krueger | |

* cited by examiner

*Primary Examiner* — Gil H. Lee
(74) *Attorney, Agent, or Firm* — Sandberg Phoenix & von Gontard PC

(57) ABSTRACT

Methods for operating a vehicle inspection or measurement system to facilitate selection of specification sets associated with a vehicle undergoing inspection or measurement based on an evaluation of vehicle identifying features and acquired vehicle measurement.

10 Claims, 4 Drawing Sheets

FIGURE 2

METHOD FOR VEHICLE SPECIFICATION FILTERING IN RESPONSE TO VEHICLE INSPECTION RESULTS

CROSS-REFERENCE TO RELATED APPLICATIONS

The present application is related to, and claims priority from, co-pending U.S. patent application Ser. No. 15/676,557 filed on Aug. 14, 2017, which in turn claimed priority from U.S. Provisional Patent Application Ser. No. 62/375,294 filed on Aug. 15, 2016, both of which are herein incorporated by reference.

STATEMENT REGARDING FEDERALLY SPONSORED RESEARCH

Not Applicable.

BACKGROUND OF THE INVENTION

The present application is related generally to a vehicle service or inspection system, and in particular, to a procedure for minimizing the number of vehicle identifying parameters required to be selected by an operator of the vehicle service or inspection system in order to recall a set of vehicle specifications.

Vehicle inspection procedures generally follow a traditional routine. Initially, when a vehicle is brought into an inspection area, an operator or service technician identifies the vehicle to a vehicle inspection system to recall vehicle inspection procedures and vehicle associated specifications. Initial identification may be made by reading the vehicle identification number (VIN), often using a barcode scanner, and the data entered into the vehicle inspection system. Using the entered VIN data, the vehicle inspection system obtains limited information identifying the vehicle make and model of manufacture. If the vehicle inspection system is in communication with a vehicle service shop network and a customer database or shop management system, additional information about the vehicle or vehicle owner may be accessible from databases associated with the connected systems. Once the vehicle has been identified, inspection procedures for the identified vehicle are carried out automatically, or by an operator or vehicle technician under the guidance of the vehicle inspection system, and the resulting measurements are compared to the recalled vehicle specifications to determine if the vehicle passes or fails the inspection.

However, in many situations, the VIN data alone is insufficient to identify a vehicle's installed options and trim levels to the same degree of specificity with which vehicle wheel alignment specification data is correlated. For example, VIN data may identify a light truck as a 2014 Dodge Ram 3500 with a gasoline engine. However, the VIN data may not identify the specific configuration of the vehicle as 2WD or 4WD, the bed length, or the installed trim level. These details are manually provided to the vehicle wheel alignment or inspection system by the operator or vehicle technician. Upon entry of all of the vehicle identifying information, including specific vehicle configuration items which will vary for each vehicle make, model, and year of manufacturer, a matching set of vehicle wheel alignment specifications (and alignment measurement procedures) is retrieved from a specification database. The vehicle is then measured or inspected, and the results compared with the retrieved set of specifications to determine if any measurements or parameters of the vehicle are outside of acceptable tolerances or ranges. Results which are within acceptable tolerances or ranges may be displayed to an operator in a first visually distinct manner (and optionally in a numerical format), while results which are outside of acceptable tolerances or ranges may be displayed to an operator in a second visually distinct manner (and optionally in a numerical format).

The process of entering the vehicle identifying information, including all of the specific vehicle configuration items required to uniquely identify the vehicle, is time consuming, often requiring the operator or service technician to carry out a visual inspection of the vehicle to determine specific details such as trim levels or installed features. Accordingly, it would be beneficial to provide a vehicle inspection system with a procedure for identifying a vehicle (and subsequently recalling necessary specifications) which minimizes the number of specific vehicle configuration items required to be selected by an operator of the vehicle inspection system in order to recall an appropriate set of specifications for the inspection or measurement procedure to be carried out, particularly where the inspection or measurement procedure is insensitive to variations in some of the information contained within a full set of vehicle specifications.

It would be further beneficial to provide a vehicle inspection system with a process for determining if a vehicle passes or fails specific inspections utilizing only a minimum number of vehicle identifying parameters in order to recall an appropriate set of relevant vehicle specifications for comparison to an acquired set of vehicle inspection results.

BRIEF SUMMARY OF THE INVENTION

Briefly stated, in a first embodiment the present disclosure sets forth a procedure for reducing the number of vehicle identifying parameters required to be selected by an operator of a vehicle service or inspection system in order to recall an appropriate set of vehicle specifications of interest from a database for use with a vehicle inspection or measurement procedure. Upon selection of each vehicle identifying parameter, a comparison is carried out across potential additional vehicle identifying parameters to determine if a selection of any additional vehicle identifying parameters is required to uniquely identify the set of vehicle specifications or measurements of interest for recall. If the comparison indicates that no additional vehicle identifying parameters are required to identify the vehicle specification or measurements of interest, i.e., the same set of vehicle specifications or measurements will be returned regardless of further selection of any additional vehicle identifying parameters, the selection process is terminated and the identified set of vehicle specification or measurements of interest is recalled from the database for use during the vehicle inspection or measurement procedure.

In a further embodiment of the present disclosure, vehicle inspection or measurement results are utilized to reduce the number of vehicle identifying parameters which must be selected by an operator in order to determine if the vehicle inspection or measurement results are within acceptable tolerances. During a vehicle inspection or measurement procedure, one or more inspection or measurement results are initially acquired. Each vehicle inspection or measurement result is compared to an acceptable range of results for all vehicle entries within a database. If the vehicle inspection or measurement results are within the acceptable range of results for all possible vehicle entries, no vehicle identifying parameters are required, and a "pass" or "acceptable" indication is provided to the operator or service technician. Correspondingly, if the vehicle inspection or measurement results fall outside of the acceptable range of results for all possible vehicle entries, no vehicle identifying parameters are required, and a "fail" or "unacceptable" indication is provided to the operator or service technician. If the vehicle inspection or measurement results are within the range of acceptance for some possible vehicle choices, but outside the range of acceptance for others, the operator or service technician is prompted to provide a vehicle identifying parameter, and the comparison is repeated across a subset of vehicle entries within the database corresponding to vehicles matching the provided vehicle identifying parameter. At each stage, the operator or service technician provides an additional vehicle identifying parameter to narrow the subset of possible vehicle entries towards a unique entry within the database, or until the comparison returns either a "pass" or "fail" indication.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is a set of OEM vehicle alignment specifications for four possible configurations of a 2015 Volkswagen Jetta;

Corresponding reference numerals indicate corresponding parts throughout the several figures of the drawings. It is to be understood that the drawings are for illustrating the concepts set forth in the present disclosure and are not to scale.

Figure 1:
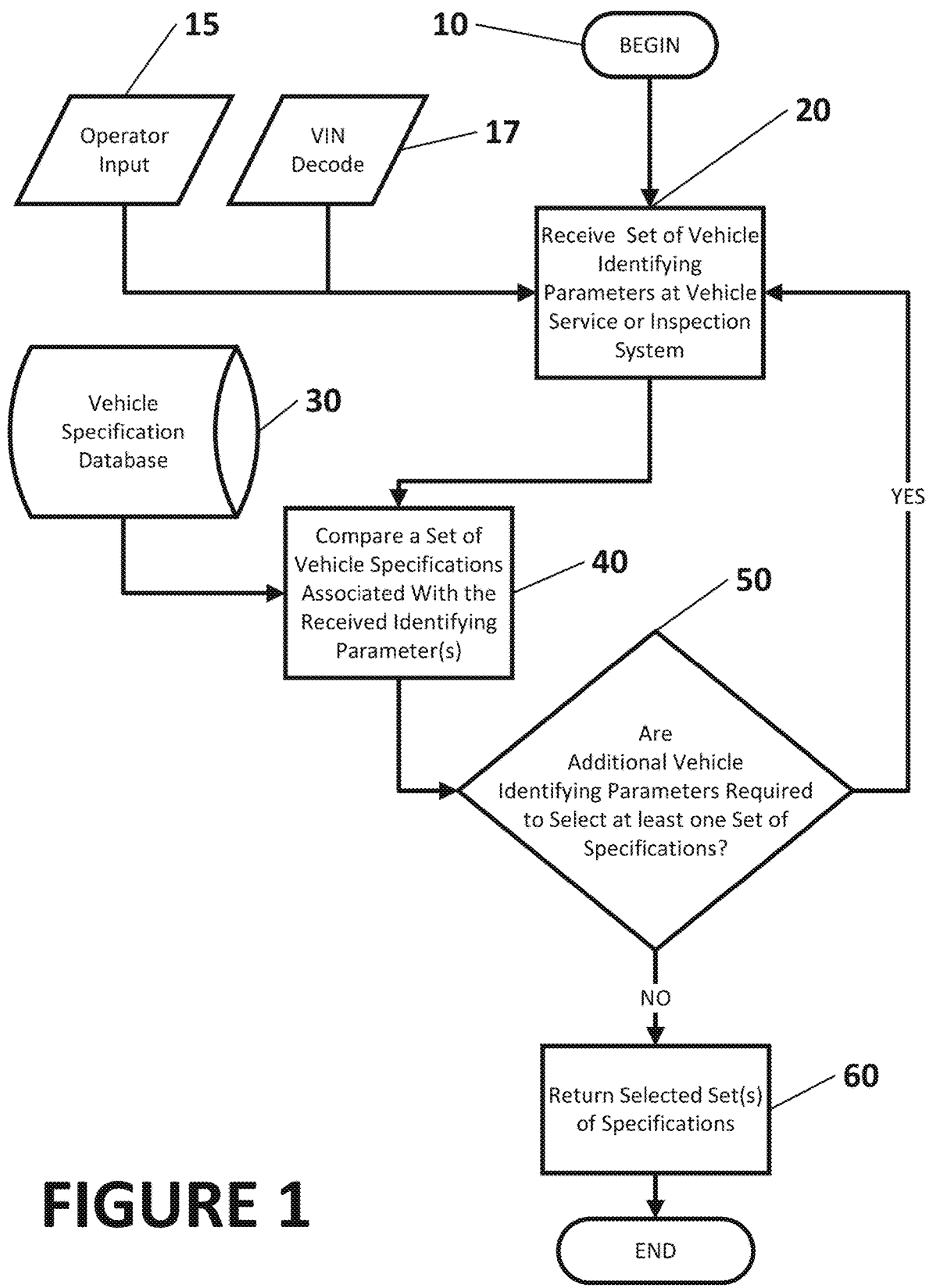
FIG. 1 is a flow chart illustrating a procedure of the present disclosure for selecting a set of vehicle specifications of interest in response to a minimal number of vehicle identifying parameters.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

It will be understood that the term "set" as used herein, such as a "set of vehicle identifying parameters", a "set of measurements", or a "set of specifications", etc. is intended to indicate a group consisting of one or more of the associated elements.

The present disclosure is generally described for implementation in a vehicle inspection or vehicle measurement system wherein complete vehicle-specific specification and vehicle-specific repair or service procedure are not required at the time a vehicle is being inspected or measured. Specifically, the present disclosure is described for implementation in a vehicle inspection system such as the Quick Check® inspection lane products manufactured by Hunter Engineering Company of St. Louis, Mo., wherein a vehicle is preliminarily inspected to determine if one or more measured vehicle parameters, such as the total toe for each axle, or a camber angle at each wheel, is within a manufacturer's specified range. These vehicle inspections are carried out in a rapid and efficient manner, intended to quickly screen vehicles for potential problems in order to determine which vehicles should be slated for further, more detailed, examination or repairs. Those of ordinary skill will recognize that while described in the context of a vehicle inspection system, the procedures of the present disclosure may be utilized with a variety of vehicle service or inspection systems, whenever there is a need to provide a set of vehicle identifying parameters in order to recall a set of vehicle specifications, measurement ranges, or measurement tolerances. An exemplary vehicle service system would be a vehicle wheel alignment system such as the HawkEye® series of wheel alignment systems manufactured by Hunter Engineering Company of St. Louis, Mo.

Turning to the figures, and to FIG. 1 in particular, a first procedure of the present disclosure is shown for operating a vehicle service or inspection system in a manner which reduces the number of vehicle identifying parameters such as make, model, year, engine, trim package, etc., required to be selected or provided by an operator when attempting to recall a set of vehicle specifications appropriate for a vehicle undergoing inspection or measurement. The procedure facilitates a recall of an appropriate set of specific vehicle specifications of interest from a vehicle specification database, such as for use with a vehicle inspection or measurement procedure, using a minimal number of vehicle identifying parameters. The specific vehicle specifications which are of interest to the operator may be limited to a single vehicle parameter, such as a thrust angle, or may include multiple parameters such as total toe for front and rear axles and/or camber for each individual wheel assembly. Initially, the procedure begins (Box 10) with an operator or service technician providing (Box 15) a set of vehicle identifying parameters, such as the vehicle make or model, to a processing component of the vehicle service or inspection system (Box 20). As an alternative to operator provided input, the set of vehicle identifying parameters may be acquired automatically (Box 17) by decoding an identification code associated with the vehicle, such as a Vehicle Identification Number (VIN), TECDOC Global Vehicle Table identification (K-type), or Aftermarket Catalog Enhanced Standard vehicle configuration database identifier (ACES vehicle number), associated with the vehicle. The identification code, such as a VIN, K-type or ACES vehicle number, may be provided to the vehicle service or inspection system manually by the operator, by a barcode scan, or through use of an associated license-plate recognition system configured to process images of a vehicle license plate using OCR technology to access a database of corresponding vehicle identification code records.

Figure 2:
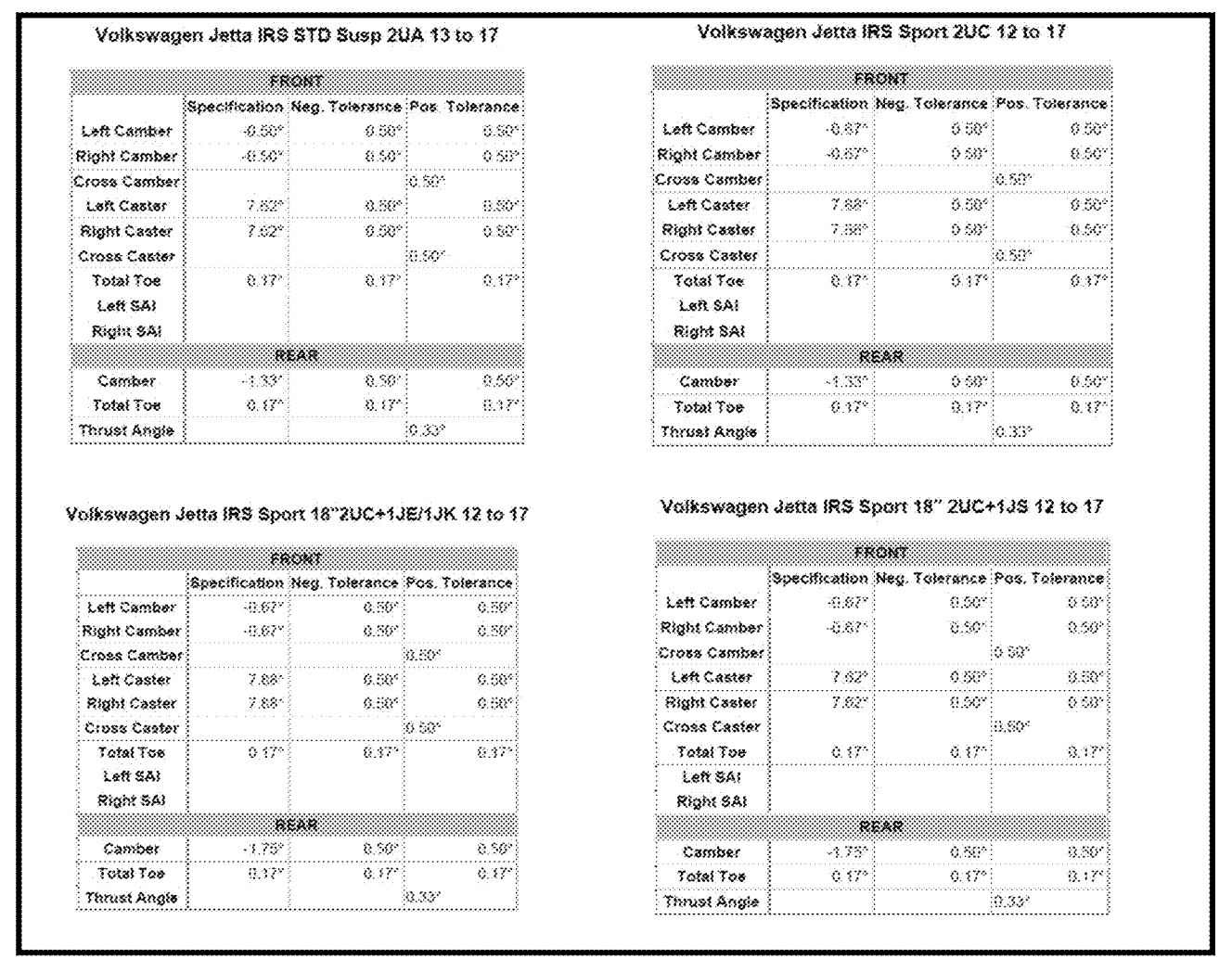

A collection of specification sets for vehicles matching the provided identifying parameters are recalled from a vehicle specification database (Box 30), which may be stored in a local memory, or accessible via a suitable communications link to a remote location such as a dedicated server or cloud-based storage. Once the vehicle identifying parameter set has been received, and two or more associated vehicle specifications recalled, the vehicle specifications within the associated set are compared (Box 40), by a suitably configured data processing component within the vehicle service or inspection system to determine if the specific vehicle specifications or measurements of interest, such as toe, camber, or caster are identical for each recalled vehicle specification with the collection. For example, as seen in FIG. 2, a 2015 model year Volkswagen Jetta is associated with four possible sets of vehicle specifications. These four sets include a "STD" model, a "SPORT" model with the 2UC trim package, a "SPORT" model with 18" wheels and the 1JE or 1JK trim packages, and a "SPORT" model with 18" wheels and the 1JS trim package.

If the vehicle specifications of interest are identical for each vehicle specification set within the collection, the vehicle undergoing service does not need to be identified with any further detail. As seen in FIG. 2, the total toe specification values (front or rear) for each of the four possible vehicle specification sets for the 2015 Volkswagen Jetta is equal to 0.17°. However, if the specifications of interest vary between vehicles matching the provided identifying parameters, further vehicle identifying details are required to narrow down the number of vehicle specifications to be considered within the associated set. For example, as further seen in FIG. 2, the front left and right camber specification values for the "STD" model of the 2015 Volkswagen Jetta are −0.50°, but are −0.67° for the various "SPORT" configurations. Similarly, the front left and right caster specification values for two configurations of the 2015 Volkswagen Jetta are 7.62°, and are 7.88° for the other two configurations.

When the comparison shown at 50 in FIG. 1 of vehicle specifications of interest indicates that no additional vehicle identifying parameters are required to identify the specific vehicle specification sets within the collection, no further vehicle identification is required (shown at "NO"), and the selection process is terminated by providing a suitable output representative of the specifications of interest to the operator. The values or tolerances for the specific vehicle specifications of interest (such as 0.17° of total toe for all 2015 Volkswagen Jetta models) are then made available to the vehicle service or inspection system (Box 60) or displayed to the operator or service technician, for use during the vehicle inspection or measurement procedure.

If the comparison (Box 50) determines additional vehicle identifying parameters are required before a specific set of vehicle specifications within the collection can be associated with the identified vehicle (shown at "YES"), (for example, as seen in FIG. 2, additional vehicle identifying information is required to identify the front camber specification values for the 2015 Volkswagen Jetta as either −0.50° or)−0.67°, the operator or service technician is again prompted to provide, at Box 20, an additional vehicle identifying parameter (e.g., "STANDARD" or "SPORT") to reduce or filter the sets of vehicle specifications within the collection, and the comparison (Box 40) is repeated using the filtered or reduced collection. The cycle (20, 40, 50) is repeated as often as necessary until no additional vehicle identifying parameters are required to uniquely identify the specific vehicle specifications of interest from within the collection of vehicle specifications. For example, referring again to the 2015 Volkswagen Jetta specifications shown in FIG. 2, if front caster is the specification of interest, merely distinguishing between the "STANDARD" and "SPORT" vehicle configurations will not uniquely resolve the set of vehicle specifications. Rather, information identifying both the vehicle wheel size (18") and trim packages "1JE, 1JK, and 1JS" is required to determine if the specification value of 7.62° or 7.88° for front caster should be utilized.

It will be recognized that the number of cycles through which the aforementioned procedure iterates may vary significantly for different vehicles. For some vehicle manufacturers with a limited product line, vehicle specifications of interest may not vary across different configurations of vehicle models (for example, all 2015 Volkswagen Jetta models have the same front and rear total toe specifications, as seen in FIG. 2). As a result, the only vehicle identifying parameters required to return a set of associated vehicle specifications may be the vehicle make, model, and year. In contrast, for a vehicle manufacturer with a complex product line, multiple vehicle identifying parameters such as the vehicle make, model, year, drive configuration, engine type, suspension configuration, and trim level may be required before the set of associated vehicle specifications can be reduced sufficiently to uniquely identify vehicle specifications of interest.

It will further be recognized that when filtering or reducing the collection of vehicle specifications following the receipt of additional vehicle identifying parameters, the processing component of the vehicle service or inspection system may be configured to either retrieve a new collection of vehicle specification sets from the vehicle specification database (Box 30) using the set of vehicle identifying parameters, or to filter the previously received collection of vehicle specification sets to remove vehicle specification sets which no longer match the updated set of vehicle identifying parameters.

As an alternative to reviewing only vehicle specifications of interest for a set of potential vehicles, in order to uniquely identify the relevant specification values for a minimally identified vehicle, a vehicle measurement or inspection system may incorporate, or have access to, a compact database of vehicle specifications which contains only the specifications of interest, such as toe or camber, and therefore does not differentiate vehicles by other specification values. With a compact database, fewer vehicle identifying characters are required to uniquely identify the values for the relevant specifications. For example, if the only specifications of interest were front and rear total toe, only those values would be stored in the compact database. As seen in FIG. 2, the 2015 Volkswagen Jetta models all share the common value of 0.17° for total toe (front or rear), and hence an operator would not be required to distinguish between the "STANDARD" or "SPORT" configurations of the vehicle.

Figure 3:
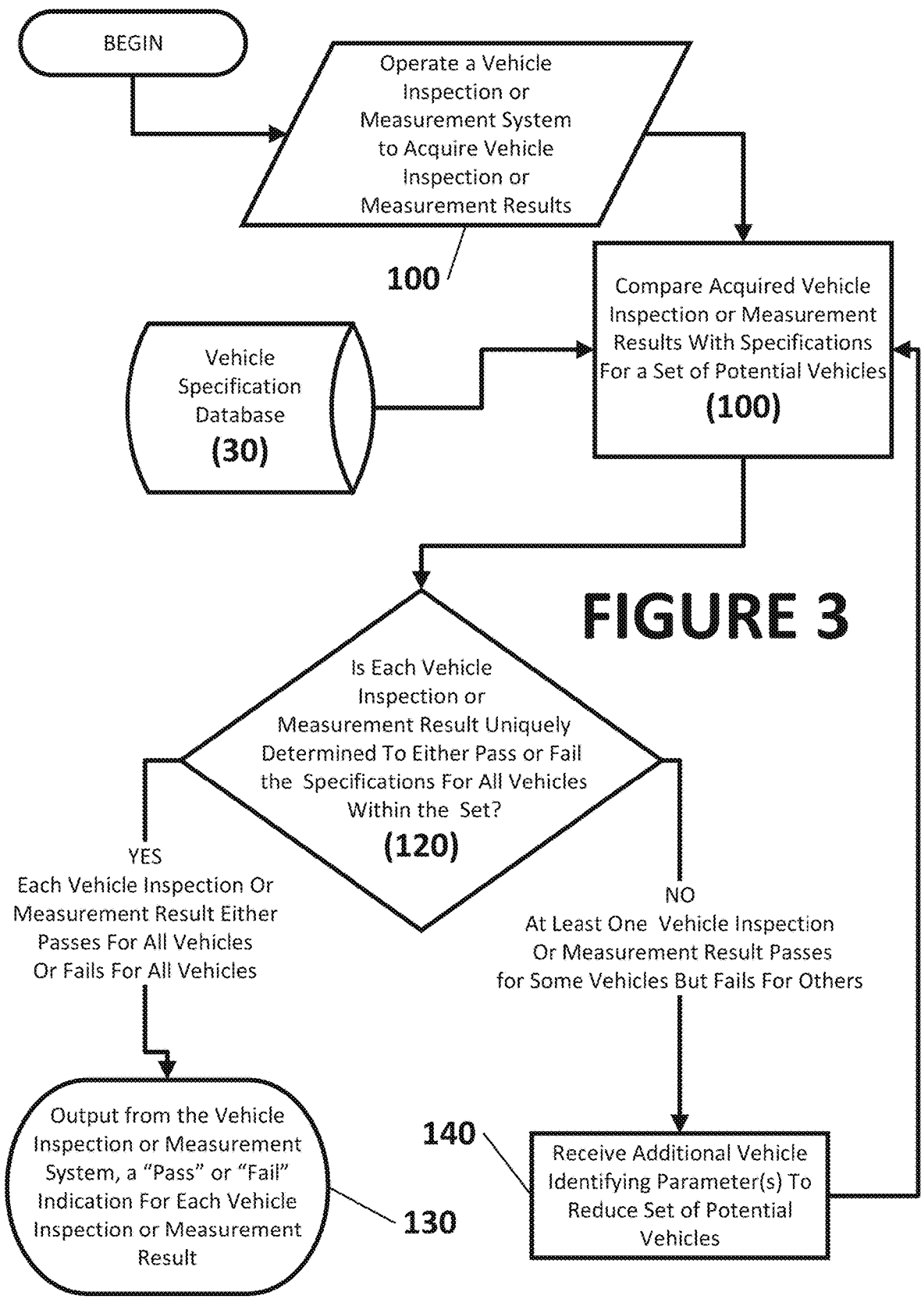
FIG. 3 is a flow chart illustrating a procedure of the present disclosure for utilizing vehicle measurements to reduce the number of vehicle identifying parameters required to definitively provide a pass or fail comparison with a specification of interest.

Some vehicle inspection systems are configured to acquire vehicle inspection or measurement results before identification of the vehicle is required or completed by an operator (or automatically, such as through the use of a license plate to VIN identification system). Turning to FIG. 3, a further embodiment of the present disclosure is illustrated, in which initially obtained vehicle inspection or measurement results are utilized to reduce the number of vehicle identifying parameters which must be selected by an operator (or automatically identified from a vehicle identification code, such as a VIN, K-type, or ACES vehicle identification) in order for a vehicle measurement or inspection system to recall vehicle specifications of interest to determine if the obtained vehicle inspection or measurement results are within acceptable tolerances. During a vehicle inspection or measurement procedure, one or more inspection or measurement results associated with the vehicle specifications of interest are initially acquired (100), together with at least one vehicle identifying parameter. The specific vehicle specifications of interest may be limited to a single vehicle characteristic, such as a front or rear total toe, or may include multiple characteristics such as camber or caster for the front wheels. Each result to be evaluated is compared (at 110) by a processing component of the vehicle inspection or measurement system to an acceptable value or range of results for specifications of interest associated with a set of specifications for vehicles recalled from the vehicle specification database 30 matching the identified vehicle parameters. The vehicle specification database 30 may be stored in a local memory, or accessible via a suitable communications link to a remote location such as a dedicated server or cloud-based storage.

Initially, the set of specifications for potential vehicles may encompass all vehicle entries within the vehicle specification database or be limited to only those matching a few initially noted vehicle identifying parameters, such as make and model. If a comparison (120) indicates the inspection or measurement results for each specification of interest are uniquely determined to either pass (i.e., match a value or be within an acceptable range of specification results) or fail (i.e., be different from a value or within an unacceptable range of specification results) for all vehicle entries within the set of specifications ("YES") (i.e., a precise result), no further vehicle identifying parameters (make, model, year, etc.) are required, and a "pass" or "acceptable" indication is returned, at 130, for each specification of interest and/or provided to the operator or service technician. For example, with reference to the 2015 Volkswagen Jetta specifications shown in FIG. 2, a vehicle having a measured front left camber of −0.75° and a measured front right camber of −0.45° would be considered to "pass" regardless of the specific model configuration selected. In other words, the measured camber values are within the permissible tolerance ranges of ±0.50° of either −0.50° (STANDARD configuration) or −0.67° (SPORT configurations). Correspondingly, a vehicle having a measured front left camber of +0.05° and a measured front right camber of −1.23° would be considered to "fail" regardless of the specific model configuration selected. In other words, the measured values are outside the permissible tolerance ranges of ±0.50° of either −0.50° (STANDARD configuration) or −0.67° (SPORT configurations).

In an exemplary configuration, a visual representation of a "pass" or "acceptable" status for a measured specification of interest is indicated by the use of a red-green color-coded bar graph display, and a reference marker located with a green region of the bar graph display. Similarly, a visual representation of a "fail" or "unacceptable" condition for a specification of interest is indicated by the use of the red-green color-coded bar graph display, and the reference marker located with a red region of the bar graph display.

If the inspection or measurement results are ambiguous, "NO", (i.e., one or more of the measurement results is within the range of acceptance for some vehicles within the set, but outside the range of acceptance for other vehicles within the set), the operator or service technician is prompted to provide a further vehicle identifying parameter (make, model, year, etc.) at 140, which is used to narrow the set of potential vehicle entries, and the comparison process (110, 120) is repeated across the reduced set of potential vehicles. For example, with reference to the 2015 Volkswagen Jetta specifications in FIG. 2, a vehicle having a measured front left camber of −1.05° and a measured front right camber of −1.15° would be considered to "fail" for a vehicle with the "STANDARD" configuration of −0.50° (±0.50°), but would be consider to "pass" for a vehicle with any of the "SPORT" configurations of −0.67 (±0.50°). So long as at least one of the inspection or measurement results remains ambiguous for the potential vehicle within the remaining set, the process is repeated with the operator or service technician providing at least one additional vehicle identifying parameter on each cycle (110, 120) to continue to reduce the set of potential vehicles until the comparison step uniquely returns either a "pass" or "fail" indication for each inspection or measurement result. For the aforementioned example, the operator would be required to identify the 2015 Volkswagen Jetta as either the "STANDARD" configuration or the "SPORT" configuration in order to uniquely return either a "pass" or "fail" indication for the acquired camber measurements.

It will be recognized that the number of cycles through which the aforementioned procedure may iterate, may vary significantly between different vehicles. For some vehicle manufacturers with a limited product line, specific vehicle specifications of interest may not vary across different configurations of vehicle models. As a result, the procedure may provide a "pass" or "fail" indication for each inspection or measurement result following the initial comparison between the inspection or measurement results and the set of potential vehicles. In contrast, for a vehicle manufacturer with a complex product line, multiple iterations of the procedure may be required, with the operator sequentially providing narrowing vehicle identifying parameters such as make, model, year, drive configuration, and trim level before the procedure can uniquely determine a "pass" or "fail" indication for each inspection or measurement result.

It will be further understood that while the present disclosure is described in the context of a binary configuration, having only pass/acceptable or fail/unacceptable final outcomes for each inspection or measurement result, it may be modified without departing from the scope of the invention to include additional possible outcomes, such as inspection or measurement results which fall within various intermediate ranges such as "repair required soon" or "operate with caution" etc., by defining appropriate ranges within which acquired measurements may fall.

Figure 4:
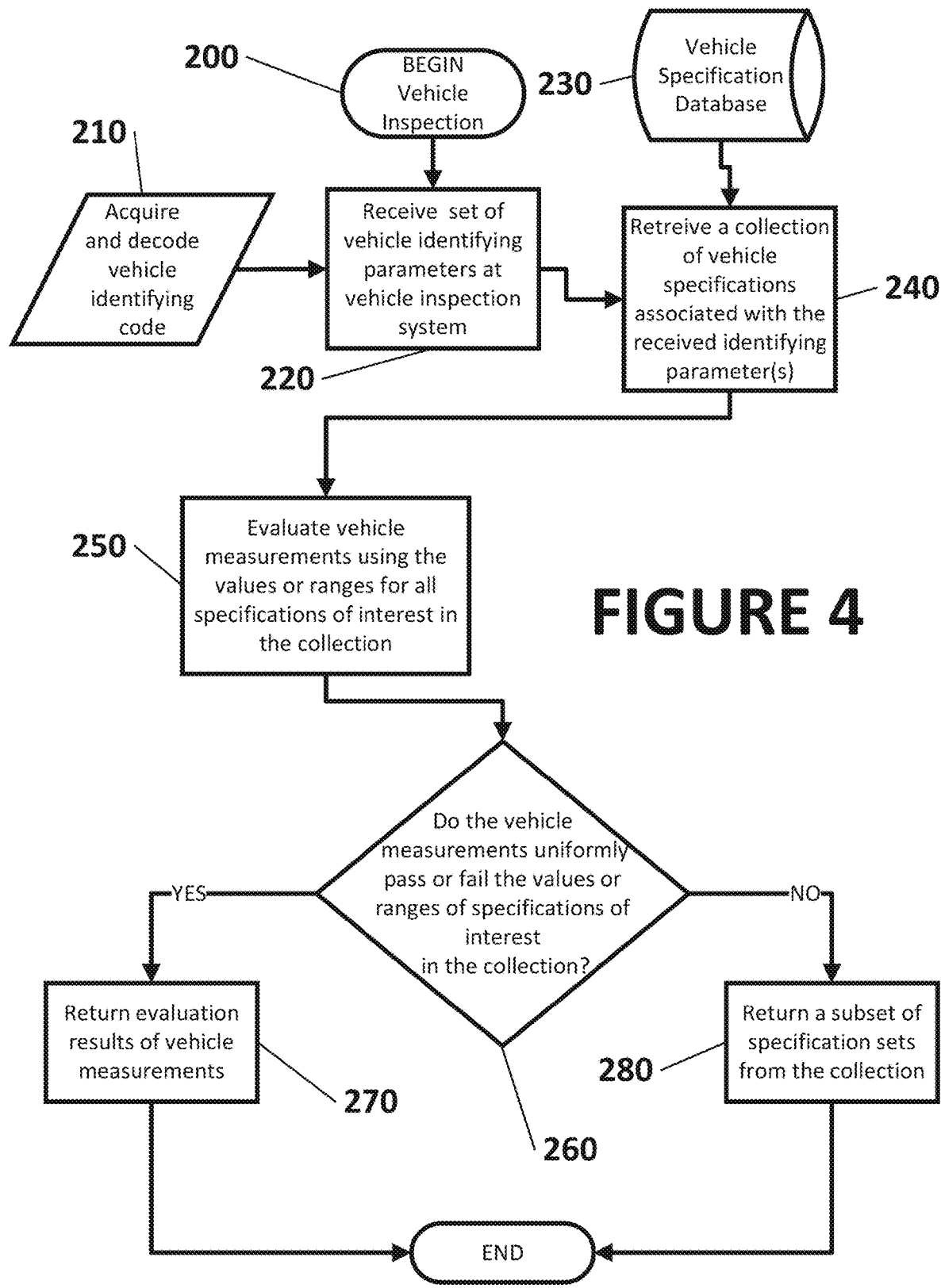
FIG. 4 is a flow chart illustrating an alternative procedure of the present disclosure for evaluating vehicles passing through an unattended vehicle inspection lane.

A further procedure of the present disclosure, illustrated with reference to FIG. 4, is particularly suitable for implementation in an unattended vehicle inspection system, wherein a vehicle is driven through an inspection lane and observed by sensors to acquire vehicle images or measurements of various vehicle characteristics. The resulting images and/or measurements are processed by a processing system of the vehicle inspection system to identify vehicle parameters and to determine if the acquired measurements are within acceptable tolerance ranges, with a resulting report generated for display, communication, or other form of output.

The vehicle inspection begins (Box 200) as a vehicle is driven through a vehicle inspection lane, within the operative field of view for a variety of sensors. In one embodiment, sensors associated with a license plate recognition component acquire images of the vehicle from which license plate character data is extracted by a processing component of the vehicle inspection system. The license plate data is utilized by the processing component to access an indexed database of license plate and vehicle identification data, such as VIN data, providing a corresponding VIN or other identifying code for the vehicle (Box 210). Alternatively, either the license plate data or vehicle identifying code may be manually input to the vehicle inspection system by an operator. Decoding of the VIN or other identifying code provides a set of vehicle identifying parameters (Box 220) to the vehicle inspection system, which may include vehicle make, model, and year of manufacture. Additional information such as vehicle drive configuration, serial number, etc., may additional be encoded in the VIN or identifying code, and subsequently accessible to the processing component of the vehicle inspection system, or alternatively, input manually by an operator.

Using the vehicle identifying parameters, either decoded from a vehicle identification code, or manually entered by an operator, the processing component of the vehicle inspection system accesses a vehicle specification database (Box 230) to retrieve a collection of vehicle specification sets which are associated with, or matched to, the vehicle identifying parameters (Box 240). The vehicle measurements acquired by the vehicle inspection system sensors are evaluated against the values or ranges for all of the specifications of interest (i.e., individual wheel toe, axle total toe, camber, etc.) for each set of specifications in the collection (Box 250). If each vehicle measurement uniformly passes or is acceptable for each set of specifications in the collection, or uniformly fails or is unacceptable for each set of specifications in the collection (Box 260—"YES"), then no further vehicle identifying parameters are required in order to reduce or filter the collection of vehicle specification sets. An evaluation of the comparison results is returned for display, inclusion in a representative report on the vehicle, and/or storage in a database. (Box 270). If at least one vehicle measurement passes or is acceptable for some sets of specification in the collection, but fails or is unacceptable for other sets of specifications in the collection, then additional vehicle identifying parameters are required in order to reduce or filter the collection of vehicle specification sets. If an operator is present, additional vehicle identifying parameters may be entered to reduce or filter the collection of vehicle specification sets, and the step of evaluating the vehicle measurements against the collection repeated (Box 250, Box 260).

In an unmanned vehicle inspection system where an operator generally is not present, or where a standard procedure does not permit the entry of additional vehicle identifying parameters, the present procedure will return an evaluation of the vehicle measurements against two or more different sets of specifications contained within the collection (Box 280), together with information indicating the vehicle identifying features which distinguish the sets of specifications included in the evaluation. For example, an evaluation of a light-duty truck may return an evaluation of vehicle individual wheel toe angles for a first set of specifications corresponding to the light-duty truck in a 2WD configuration, together with an evaluation of the vehicle individual wheel toe angles for a second set of specifications corresponding to the light-duty truck in a 4WD configuration. Returning multiple evaluations, together with the distinguishing vehicle identifying features, enables an operator or customer to subsequently review the returned information and quickly note the relevant results upon further examination of the distinguishing vehicle identifying features.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for operating a vehicle service or inspection system to reduce a total number of vehicle parameters required to be identified in order to recall specification values or ranges for a set of vehicle specifications of interest from a vehicle specification database, comprising:
   receiving, at a processing component of the vehicle service or inspection system, a set of input parameters identifying a vehicle undergoing an inspection or service, said set of input parameters containing at least one vehicle identifying parameter selected from a closed set of vehicle identifying parameters;
   accessing, with said processing component, a database of vehicle specification sets to retrieve a collection of vehicle specification sets, each retrieved set of vehicle specifications associated with said set of input parameters;
   comparing, with said processing component, each set of vehicle specifications within said collection of vehicle specification sets to determine if values or ranges of select vehicle specifications within each of said vehicle specification sets are identical;
   if said comparison determines said values or ranges of select vehicle specifications within each of said vehicle specification sets are identical, generating an output representative of said values or ranges of said select vehicle specifications;
   if said set of input parameters lacks at least one vehicle identifying parameters from said closed set of vehicle identifying parameters,
   a) revising said set of input parameters by receiving, at said processing component, an additional vehicle identifying input parameter remaining from said closed set of vehicle identifying parameters,
   b) reducing, at said processing component, said collection of vehicle specification sets to contain only vehicle specification sets which are associated with said revised set of input parameters, and
   c) repeating said step of comparing at least once.

2. The method of claim 1 wherein said closed set of vehicle identifying parameters including make, model, year, drive configuration, engine type, and at least one vehicle trim level.

3. The method of claim 1 wherein said at least one vehicle identifying parameter received at said processing component is manually provided by an operator.

4. The method of claim 1 wherein said at least one vehicle identifying parameter received at said processing component is provided by decoding a VIN associated with a vehicle undergoing a service or inspection procedure.

5. The method of claim 4 further including the step of acquiring said VIN from a database through a license plate optical character recognition system operatively coupled to the vehicle service or inspection system.

6. The method of claim 1 wherein said select vehicle specifications include at least one of a thrust angle, an axle total toe, an individual wheel toe, or an individual wheel camber.

7. The method of claim 1 wherein said output representation of said select vehicle specification values or ranges is alpha-numeric.

8. The method of claim 1 wherein said output representation of said select vehicle specification values or ranges is a graphical representation.

9. An apparatus for automatically evaluating a set of parameters associated with a vehicle currently undergoing an inspection or service, comprising:
   an accessible database storing a plurality of vehicle specification sets, each set of vehicle specifications associated with said set of vehicle parameters, and wherein each vehicle specification within a set setting forth an associated value or range;
   vehicle service or inspection system configured to acquire data values for a set of parameters associated with said vehicle currently undergoing an inspection or service, said set containing at least one current parameter associated with said vehicle;
   wherein said vehicle service or inspection system includes a processing component configured to select, based on said acquired set of parameters, a subset of said stored plurality of vehicle specification sets from said accessible database;
   wherein said processing component is configured to determine a portion of said selected subset of said stored plurality of vehicle specification sets having overlapping values or ranges for said acquired set of parameters associated with said vehicle currently undergoing said inspection or service; and
   wherein said processing system is further configured to respond to said determined portion being less than all of said selected subset by
      a. receiving at least one data value for at least one additional parameters for inclusion in said set of parameters associated with said vehicle currently undergoing an inspection or service; and by
      b. reducing said determined portion of said subset of said stored plurality of vehicle specification sets having overlapping values or ranges for said set of parameters associated with said vehicle currently undergoing said inspection or service.

10. The apparatus of claim 9, wherein said processing system is further configured to respond to said determined portion equaling said selected subset, and to said acquired data values for said set of parameters associated with said vehicle currently undergoing said inspection or service falling within an acceptable tolerance for each value or range associated with said corresponding parameters of said selected subset of vehicle specification sets, by returning an indication of acceptability for said vehicle.

* * * * *